United States Patent [19]

Hand et al.

[11] Patent Number: 5,431,927
[45] Date of Patent: Jul. 11, 1995

[54] PET FOOD PRODUCT HAVING ORAL CARE PROPERTIES

[75] Inventors: Michael S. Hand, Maple Hill; John J. Hefferren; Brian Marlow, both of Lawrence; Lon D. Lewis, Topeka, all of Kans.

[73] Assignee: Colgate-Palmolive Company, Piscataway, N.J.

[21] Appl. No.: 899,534

[22] Filed: Jun. 16, 1992

[51] Int. Cl.$^6$ .............................................. A23K 1/00
[52] U.S. Cl. ....................... 426/2; 426/805; 426/443; 426/448; 426/623; 426/144; 424/49
[58] Field of Search ................ 426/72, 73, 74, 2, 144, 426/443, 448, 449, 623, 805, 802; 424/49

[56] References Cited

U.S. PATENT DOCUMENTS

| | | | |
|---|---|---|---|
| 4,006,266 | 2/1977 | Bone et al. | 426/805 |
| 4,011,345 | 3/1977 | Bartsch | 426/805 |
| 4,022,915 | 5/1977 | Zukerman | 426/805 |
| 4,073,962 | 2/1978 | Spata et al. | 426/802 |
| 4,310,558 | 1/1982 | Mahm, Jr. | 426/805 |
| 4,364,925 | 12/1982 | Fisher et al. | 426/104 |
| 4,623,546 | 11/1986 | Holay et al. | 426/449 |
| 4,959,238 | 9/1990 | Hall et al. | 426/802 |
| 5,000,740 | 3/1991 | Stamples et al. | 426/805 |
| 5,000,943 | 3/1991 | Scaglione et al. | 426/805 |
| 5,000,973 | 3/1991 | Scaglione et al. | 426/549 |
| 5,094,870 | 3/1992 | Scaglione et al. | 426/805 |

FOREIGN PATENT DOCUMENTS

| | | |
|---|---|---|
| 0088573 | 9/1983 | European Pat. Off. . |
| 2067884 | 8/1981 | United Kingdom . |
| 2232573 | 12/1990 | United Kingdom . |
| 9306742 | 4/1993 | WIPO . |

OTHER PUBLICATIONS

Database WPI, Week 8606, Derwent Publications Ltd., London, GB; AN 86-039141 & JP-A-60 259 176, (Ikegai Iron Works KK), 21 Dec. 1985, *abstract*.
Patent Abstracts of Japan, vol. 013, No. 427 (C-639), 22 Sep. 1989 & JP-A-01 165 345, (Fuji Oil Co. Ltd.), 29 Jun. 1989 *abstract*.
Database WPI, Week 9224, Derwent Publications Ltd., London, GB; AN 92-197493 & JP-A-4 131 219, (Sekisui Chem. Ind. Co. Ltd.), May 1, 1992 *abstract*.
Patent Abstracts of Japan, vol. 016, No. 428 (M-1307), Sep. 8, 1992 & JP-A-04 147 820, (Tsutsunaka Plast. Ind Co. Ltd.), May 21, 1992 *abstract*.

*Primary Examiner*—Robert A. Dawson
*Assistant Examiner*—Ana M. Fortuna
*Attorney, Agent, or Firm*—Paul Shapiro; Robert C. Sullivan

[57] ABSTRACT

A pet food product prepared from a fiber containing nutritionally balanced mixture of carbohydrate protein, fat, vitamins and minerals, the product having an expanded striated structural matrix which fractures when chewed by the pet. The product when chewed by the pet exhibits an improved mechanical tooth cleansing function whereby a substantial reduction in plaque, stain and tartar on the pet's teeth is affected. The product is prepared by extruding a plasticized mixture of food ingredients through a discharge passageway, the internal walls of which are maintained at a coefficient of friction no greater than 0.2 so that a condition resembling laminar flow exists in the extrudate.

11 Claims, 2 Drawing Sheets

PET FOOD PRODUCT HAVING ORAL CARE PROPERTIES

BACKGROUND OF THE INVENTION

1. Field of Invention

This invention relates to a solid animal food product having a structural matrix which promotes oral care and hygiene in animals. In particular this invention relates to a pet food product having an expanded, striated structural matrix which when chewed by pets such as dogs and cats, imparts an improved mechanical dental cleansing benefit to the pet's teeth.

2. Description of the Prior Art

Animal pets, such as dogs and cats, like their human counterparts, are subject to dental health problems. These problems can be traced to the formation of bacterial plaque which forms on the exterior surface of teeth. Plaque is a water white gelatinous mass of sticky film of bacteria, polysaccharides and salivary proteins which is not easily washed away. Plaque is now generally recognized as the main culprit of poor oral health. Bacteria that produce the acid for the caries process are held to the tooth surface by the plaque matrix as well as other bacterial agents which cause redness and swelling (gingivitis). The presence of these bacteria, if left untreated, may spread to cause malodor, periodontal disease, gingival pockets and bone loss.

Dental calculus, or tartar, is the result of the thickening and hardening (mineralization) of dental plaque. Tartar which is not easily removed accumulates on the tooth surface, mainly at the gingival margin. It is a hard mineral deposit containing predominantly calcium and phosphate, very tightly bound to the tooth surface. Once it is formed, tartar is extremely difficult to remove except by a veterinary professional. Tartar can become unsightly if growth is left unimpeded, and elimination is desirable as the porous surface of the calculus will be covered by a thin layer of unmineralized plaque which can cause constant irritation of the gums and can trigger other problems once calculus is formed below the gum line.

Commercial animal pet foods, when chewed by the animal, do not provide sufficient mechanical surface cleaning to teeth to provide for plaque removal from the animal's teeth necessary for optimum dental health.

A variety of products are manufactured to provide animal pets with objects to chew or gnaw. They are intended to provide the pet with exercise for the teeth to maintain a healthy condition satisfying a need which arose when the natural pet food, raw meat, was replaced with processed pet foods. Rawhide strips knotted on the ends to resemble bones, for example, provide abrasion for cleaning teeth by removing tartar and massaging the gums, which is not provided by the typical canine dog food. The rawhide dog chews are expensive, and the indigestible leather fragments swallowed by the dogs frequently cause severe gastrointestinal blockage or diarrhea.

European patent 272,968 discloses a chewable product for dogs and other domestic animals wherein certain aqueous solutions of oral care agents, e.g., sodium fluoride (anti-caries agent), sodium benzoate (anticalculus agent) and bromochlorophene (antimicrobial/antiplaque agent) are used to soak rawhide, beef tendon, or ligament. The solution treated product is then dried whereby the oral care agents are absorbed into the surface of the product.

U.S. Pat. No. 5,011,679 discloses a tartar preventing dog chew composed of raw hide having an edible coating containing an anti-tartar alkali metal inorganic phosphate.

U.S. Pat. Nos. 5,000,940 and 5,000,943 disclose baked dog biscuits containing an inorganic pyrophosphate salt, e.g., tetrasodium pyrophosphate salt, which when chewed and/or eaten by dogs cause a reduction in tartar accumulations on their teeth.

A disadvantage of the prior art baked pet oral care products is that they are hard and brittle products and, although abrasive and initially effective to remove plaque from teeth, quickly lose their effectiveness when chewed by the animal because rapid crumbling of the product during chewing leads to loss of abrasive contact of the product with the teeth.

There is therefore a need in the pet food field for a nutritional food product which is consumable without gastrointestinal complications and effective to abrasively remove plaque when chewed by pet animals such as dogs and cats.

SUMMARY OF THE INVENTION

This invention is directed to an extruded animal food product having an expanded, striated structural matrix which, when chewed by the animal, effectively removes tartar, stain and plaque on the animal's teeth through a mechanical cleansing action without causing gastrointestinal distress. When chewed, the striated product fractures along the striations whereby the animal's teeth are retained in increased abrasive contact with the fractured layers, the teeth being abraded and mechanically cleaned by the surfaces of the separated layers as the product is chewed by the animal increasing the time that the product is retained in mechanical cleaning contact with its teeth. The extruded striated product has a low moisture content and is preferably formed from an ingredient mixture of carbohydrate, fat, protein and fiber bearing ingredients and nutritional balancing ingredients such as vitamins and minerals.

During the extrusion process to prepare the food product of the present invention, the ingredient mixture is formed into an expanded, striated product by moving the mixture under plasticizing mechanical agitation and increasing levels of temperature and shear to form a flowable mass which is advanced through a discharge passageway, the inner walls of which have a coefficient of friction no greater than 0.2, to effect a flow state through the passageway resembling laminar flow, whereby the plasticized product is extruded as a continuous strand of product in an expanded and stratified condition with the fibers incorporated in the product flowing in transverse striations.

The strand of striated product is then segmented into discrete particles or pellets by cutting means upon exit of the strand from the extruder. The pellets are then conveyed to a drying system, e.g. heated air, and the moisture level reduced to about 11% or less.

DESCRIPTION OF THE PREFERRED EMBODIMENTS

Figure 1:
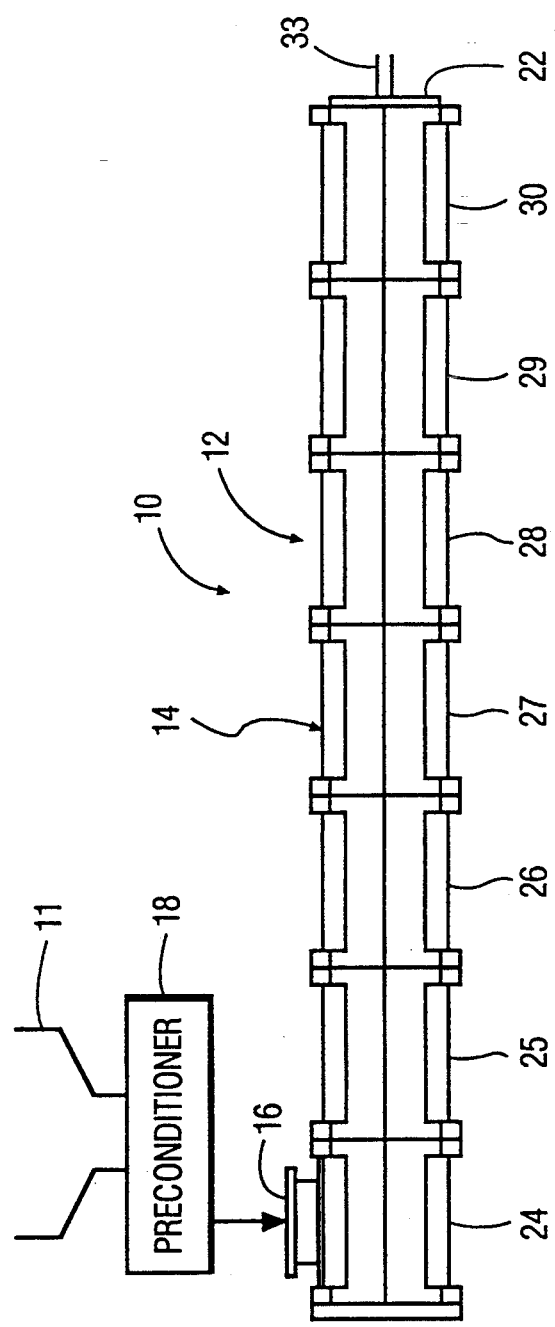
FIG. 1 is a schematic illustration of an embodiment of an extrusion apparatus which can be used to manufacture the animal food product of the present invention.
Figure 2:
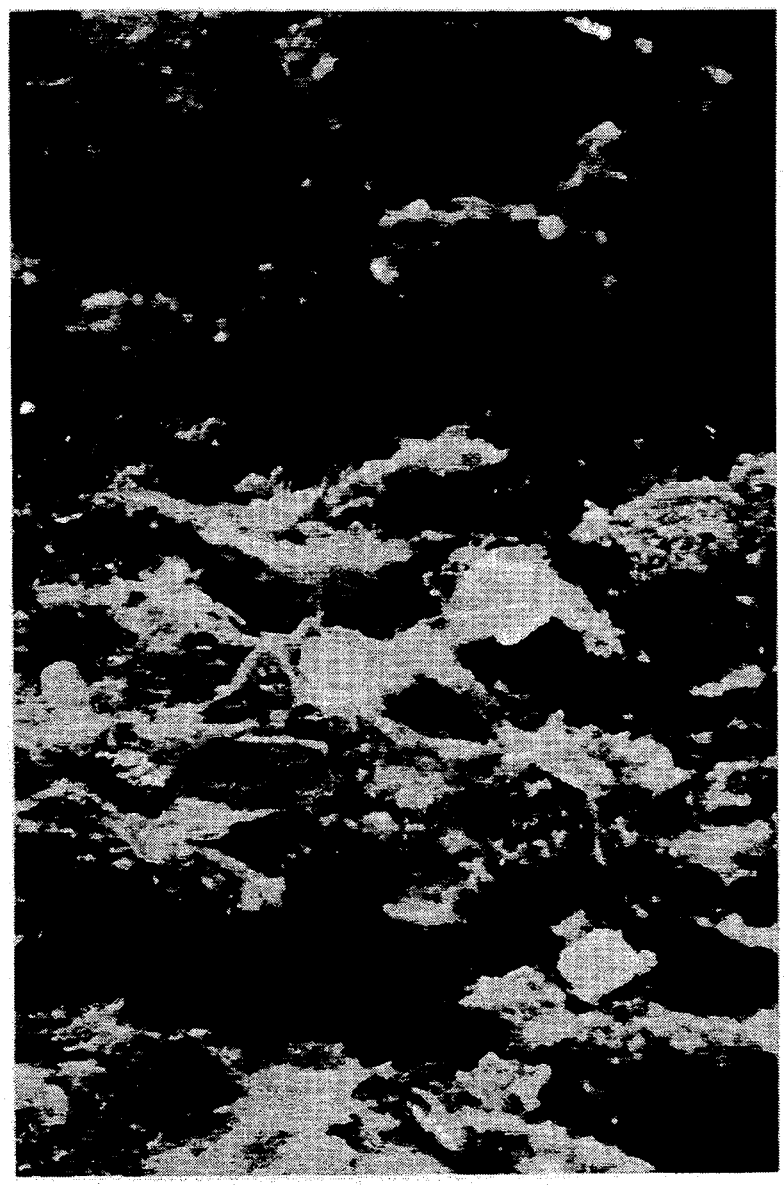
FIG. 2 is a photomicrograph (360× magnification) of a cross-section through the food product of the present invention having fibrous striations transversely aligned through the matrix.

To manufacture the striated food product of the present invention, one can advantageously use a heatable extruder having one or more transfer screws within a closed heatable barrel and a restricted extrusion discharge passageway such as a die, nozzle or pipe at the front end of the barrel, the internal walls of the passageway being maintained to have a coefficient of friction no greater than about 0.2. The barrel, in conjunction with the screw and die, creates during operation a closed chamber which prevents the release of existing water vapor from the food product and system. The food product mixture of carbohydrate, protein, fat and fiber bearing ingredients is first preconditioned and moisturized with steam and water and then subjected to a plasticizing combination of temperature, shear and pressure in the extruder barrel whereby the ingredient mixture is converted into a flowable mass. The advancing mass builds up sufficient shear to cause the plasticized mixture to be pushed at the desired temperature and pressure to and through the discharge passageway.

The plasticized mixture entering the discharge passageway from the transfer screw is subjected to compression and temperature sufficiently high so that the mixture is cooked as it flows through the discharge passageway. During the passage of the plasticized mixture through the discharge passageway, due to the low coefficient of friction of the internal walls, conditions of extrudate flow are induced which are believed to approximate laminar flow.

Laminar flow is distinguished from turbulent flow which is the normal flow condition of extruded plasticized animal food products. In turbulent flow, fluid elements are in chaotic motion, and small random fluctuations in the velocity at a point will exist even though the average mean velocity may remain constant along its axis. Laminar flow is a flow with constant preparation of streamlines so that constant velocity surfaces remain at constant separation and laminae or sheets of fluid slide frictionless over one another. By creating conditions during the extrusion of the product resembling laminar flow, the fiber bearing ingredients in the product of the present invention are aligned in transverse striations in the product matrix. In contrast, fiber-containing food products which are extruded under conditions of turbulent flow contain the fibrous ingredients randomly distributed in the food product. Such food product, when chewed by an animal, crumbles rather than fractures and exerts limited mechanical cleaning action on the animal's teeth.

During extrusion of the food product of the present invention, moisture in the extrudate is in a superheated state and flashes to steam when the extrudate leaving the discharge passageway has the compression suddenly relieved, the escaping steam swells and expands the extrudate, which exits the discharge passageway in the form of a thick strand ready to be segmented into pellets or the like.

By maintaining the inner walls of the passageway at a coefficient of friction no greater than 0.2, and preferably about 0.04 to about 0.1, conditions resembling laminar flow are believed to be induced during the extrusion of the plasticized fiber containing food product of the present invention, and as a result, an extrudate having a striated structural matrix is obtained; i.e., the extrudate product has fibrous striations transversely aligned through the product microstructure.

To maintain the walls of the discharge passageway at a coefficient of friction of no greater than about 0.2, the walls are desirably coated with a coating material such as polytetrafluoroethylene which has a coefficient of friction of less than about 0.2. Polytetrafluoroethylene coating materials have a coefficient of friction in the range of about 0.04 to about 0.1 are available commercially from E.I. Dupont de Nemours under the trademarks Teflon and Silverstone. Teflon has a coefficient of friction of about 0.04. Silverstone has a coefficient of friction of about 0.1.

Typically, a condition resembling laminar flow is obtained in the extrudate of the present invention by passing the plasticized food ingredient mixture, heated to a temperature of about 240° to about 320° F. and preferably about 270° to 300° F. at a relatively low velocity, e.g. about 12 to about 20 in./sec., preferably about 13 to about 17 in./sec. and most preferably about 14 to about 16 in./sec., through a discharge passageway having a length of about 2 to about 4 inches and a diameter of at least about 0.35 inches and preferably about 0.5 to about 0.75 inches, the inner walls of the passageway being coated with a layer of polytetrafluoroethylene.

The extruded food product of the present invention is a solid, uniform, expanded composition having fibrous striations extending transversely through the matrix microstructure. The food product, when chewed by the animal, unlike baked or other extruded products, does not crumble, but instead fractures along the matrix striations and hence offers the animal the intended teeth cleansing benefits stemming from the mechanical cleansing and other abrasive contacts with the separated matrix layers in the chewed striated product. In addition, as the striated fibrous product does not crumble as the animal chews on the product, the product clings in adhered contact with the teeth for an extended time prolonging the mechanical dental cleansing action.

The expanded, striated product of the present invention has a density of about 10 to about 35 lbs/ft$^3$, and a typical nutritional content as follows:

| Ingredient | % by Weight |
| --- | --- |
| Carbohydrate | about 35 to about 70 |
| Protein | about 10 to about 35 |
| Fat | about 10 to about 20 |
| Fiber | about 10 to about 25 |
| Nutritional balancing agents such as vitamins and minerals | about 0.01 to about 0.40 |

In preparing the final product, the moisture content of the expanded extrudate is adjusted to the range of about 5 to about 11%. At moisture levels below 5% the product becomes too hard to be easily chewed by the animal and for this reason moisture levels less than 5% in the product are to be avoided. At moisture levels above about 11% the hardness of the product begins to decrease to levels at which the mechanical cleaning efficacy of the striated product begins to be compromised. Maximum mechanical cleaning efficacy of the striated product is achieved at a density preferably of about 20 to about 30 pounds (lbs.) per cubic foot (ft$^3$) and a fiber level preferably about 15 to about 20% by weight. At these fiber levels the product has the desired degree of striation to achieve the desired degree of self-adhesion and tooth clinging characteristics.

To further improve palatability and energy (caloric) levels, the dried, extruded striated product may be coated with about 1 to about 13% additional fat.

While the striated product of the present invention can be any of several shapes, the shapes which are most desirable for mechanical cleaning efficacy include a cylindrical or disc shape. Disc-shaped pellets having thickness of about 0.32 to 0.70 inch, a diameter of about 0.7 to about 1.2 inch are most preferred in the practice of the present invention.

Suitable ingredients which may be used to prepare the animal food product of the present invention generally contain substantial amounts of animal protein derived from poultry by-products and high protein plant sources such as soybeans as well as fiber derived from sugar beet, soy and pure cellulose and substantial amounts of carbohydrates provided by cereals and grains such as wheat and rice as well as fats (animal or vegetable) such as tallow or soy oil. Small amounts of vitamins, minerals, salts, flavorings and preservatives are also generally included in the food product of the present invention to provide nutritional balance and palatability. A typical nutrient food product of the present invention is prepared from a mixture of the following ingredients:

| Ingredient | % by Weight |
|---|---|
| Corn (Ground) | 10–30 |
| Rice Flour | 30–50 |
| Cellulose Fiber | 15–25 |
| Poultry By-product Meal | 10–15 |
| White Grease | |
| Inorganic Salts (NaCl, KCl, $Ca_2SO_4$) | 0.5–2.0 |
| Vitamins | 0.01–0.2 |
| Minerals | 0.01–0.2 |
| Preservative | 0.01–0.2 |

In preparing the striated matrix animal food product present invention, the mixture of carbohydrates, vegetable and animal protein, fat, fiber and sufficient vitamins and minerals selected to yield a nutritionally balanced diet is mixed and preconditioned or moisturized within a preconditioner or mixing cylinder wherein the ingredients are contacted with steam and moisture. The moisturized mixture is then introduced into an extruder, which can be either a single or twin screw type extruder, which cooks the mixture to yield an extruded product. The extruder is provided with at least one helical screw therethrough which axially rotates to advance the material through the extruder.

In the pre-conditioner, the mixture of ingredients is subjected to steam and moisture in order to adjust the moisture content of the mixture to between about 15 and 30% by weight. The conditioned mixture is then mixed and extruded under conditions of elevated temperature e.g. about 100° to about 250° F. and pressure, e.g., about 100 to about 1000 psi through a shaped die or nozzle, the inner walls of which are maintained at a coefficient of friction no greater than about 0.2 to form a continuous strand of an expanded striated product that is segmented into discrete pieces or pellets by rotating knives or other cutting means upon exit of the strand from the extruder. The pellets are then dried at a controlled temperature, e.g. about 200° to about 300° F. to adjust the moisture level of the extruded product to about 5 to about 11% by weight and preferably 7 to about 9% by weight. The dried pellets have a density in the range of about 10 to about 35 lbs/ft$^3$. Thereafter the pellets may be tumbled in a coating reel and coated with a layer of animal and vegetable oil to increase the caloric content and palatability of the product.

In FIG. 1, there is shown one embodiment of an extrusion apparatus 10 which can be used to manufacture the expanded, striated food product of the present invention. The extrusion apparatus 10 includes an extruder 12 having a barrel 14 with an inlet 16 located below the outlet of a preconditioner 18; the extruder 12 also having an outlet 20 with a die 22. Hopper 11 is provided to pre-mix the ingredients prior to preconditioning. The barrel 14 as depicted comprises seven barrel sections 24, 25, 26, 27, 28, 30, although the number of barrels may vary without departing from the principles of the present invention. The barrel sections are interconnected to present an elongated bore through the barrel 14 of the extruder 12. Two co-rotating, flighted material advancing screws (not shown) are received in the bore of the barrel and are intermeshed along the majority of the length of the extruder barrel 14 and terminate in the die section 22. The screws feed material to and through the extruder assembly, including a die 22, at an appropriate velocity and in a state of laminar flow. Extrusion apparatus 10 of the type illustrated in FIG. 1 is available from the Wenger Manufacturing Company such as the Wenger TX 80 Twin Screw Extruder. The pre-conditioner 18 shown in the Figure is also manufactured by Wenger Manufacturing, Inc.

In preparing the expanded, striated product of the present invention, the ingredients from which the food product is extruded are first mixed in a mixer such as a ribbon mixer and fed to hopper 11. These ingredients include protein materials such as poultry by-product; carbohydrates such as corn, rice; and fiber such as cellulose fiber; vitamin mix and mineral mix. The mixed ingredients are metered to the preconditioner 18 and admixed with fats such as white grease which are fed directly into the preconditioner 18 at a rate between about 0.2 to 0.4 pounds/minute (lbs./min.). In the preconditioner 18, the mixture of ingredients is fed thereto at a rate between 600 and 1200 pounds (lbs./hr.) and is further mixed with water which is introduced into the preconditioner at a rate of 60 to 140 lbs./hr (1 to 2.3 lbs./min.). The temperature of the mixture is raised from ambient to 170° to 210° F. by the injection of steam into the preconditioner 18 at the rate of 60 to 160 lbs./hr. (1 to 2.7 lbs./min.). Total residence time in the preconditioner 18 generally ranges from 0.5 to 2.5 minutes.

Preconditioning the mixture with steam and water initiates hydration of the carbohydrate and fibrous ingredients which is completed by the mechanical working during the extrusion process.

Once the mixture of ingredients and water is introduced into the extruder barrel 14, the mixture is advanced along the length of the barrel 14 by axial rotation of the screws. The mixture is sequentially advanced through the extruder and finally through the die 22 at the outlet of the extruder 12, the inner walls of the die 22 being coated with a material having a coefficient of friction no greater than 0.2. The die 22 generally consists of an elongated tubular nozzle about 2.0 to about 4.0 inches long, having an inner diameter of about 0.5 to about 1.5 inch. The inner surfaces of the die 22 are preferably coated with a polymeric coating such as a fluorinated polyolefin resin such as polytetrafluoroethylene having a coefficient of friction of about 0.04 to about 0.1. By flowing the extrudate through the coated die at a velocity of about 12 to about 20 in./sec., a condition resembling laminar flow is created in the extrudate. As the food ingredient mixture passes through the barrel sections 24, 25, 26, 27, 28, 29, and 30, it is mixed, cooked and subjected to barrel temperatures in the range of about 100° to about 250° F. preferably about 170° to about 210° F. The build-up of plasticized food ingredient mixture transferred to the die 22 by the transfer screw causes pressures of about 100 to about 1000 psi to be applied to the mixture at the die opening. The extrudate is flowed through the die 22 at a temperature of about 240° to about 320° F. Total residence time in the die 22 is about 0.10 to about 0.35 seconds.

The extrudate strand 30 as it leaves the die 22 has a moisture content of about 10 to about 40% water by weight and preferably about 15 to about 25% water by weight. The extruded strand 30 swells upon exiting the die due to flashing of moisture to steam producing an expanded, striated structure. The strand is cut into 0.32 to 0.75 inch lengths to form pellets and then placed in an oven at 200° to 240° F. for 15 to 30 minutes to dry to about 5 to about 11% moisture. At this moisture level, the dried product has a density of about 12 to about 30 lbs/ft$^3$.

The invention is further illustrated by the following specific but non-limiting Example.

EXAMPLE

A solid, pelletized, nutritionally balanced dog food product having an expanded, striated structural matrix was prepared in accordance with the present invention by first mixing the following ingredients:

| Ingredient | Weight % |
| --- | --- |
| Brewers Rice | 42.220 |
| Yellow Corn | 22.895 |
| Cellulose Fiber | 19.300 |
| Poultry by-product meal | 13.993 |
| Sodium Chloride | 0.362 |
| Potassium Chloride | 0.362 |
| Calcium Sulfate | 0.603 |
| Choline Chloride | 0.121 |
| Vitamin Mix | 0.048 |
| Mineral Mix | 0.048 |
| Ethoxyquin (Preservative) | 0.048 |

The ingredients were blended in a ribbon mixer for five minutes and milled through a hammermill having screen size of 3/64 inch.

The milled mixture was fed to the hopper 11, of a Wenger twin screw extruder (Model No. TX-80) equipped with a preconditioner 18. The TX-80 extruder was of the type schematically illustrated in the Figure and was provided with two rotatable, flighted material advancing screws and had a total of 7 barrel sections and terminated in a spacer plate die converging to a 0.75 inch diameter die, 2.87 inches in length, the inner contact surfaces of which were coated with a layer of Teflon.

The mixture, having a moisture content of 10.40%, was fed to the preconditioner at a rate of 890.0 pounds per hour. The mixture was raised in temperature to 180° F. by the injection of steam introduced at a rate of 2.17 pounds per minute into the preconditioner. Water was introduced into the preconditioner at the rate of 2.13 pounds per minute. Choice white grease was added to the preconditioner at the rate of 0.3 pounds per minute.

The preconditioned mixture was fed into the inlet 16 of the extruder feeding zone. The screws of the extruder were rotated at a speed of 395 rpm.

Temperatures of the extruder barrel sections were maintained at 111° F., 154° F., 198° F., 168° F., and 183° F. and 162° F. for the second, third, fourth, fifth, sixth and seventh, barrel sections respectively. The mixture was advanced through the die at a temperature of 270° F. at a velocity of 17.9 in/sec.

Product rate through the die was 980 pounds per hour. The die issued the extrudate in the form of a strand 0.75 inch in diameter. The strand product swelled upon issuing from the die due to moisture in the extrudate flashing to steam. The strand was cut into 0.50 inch thick disc-shaped pellets. The pellets had an expanded structural matrix having fibrous striations transversely aligned through the microstructure with a water content of 23.6% by weight. The pellets were then conveyed to a forced air drying system and the moisture level reduced to 7.3% by weight at a temperature of 220° F. The dried pellets had a density of 26 lbs/ft$^3$. The dried pellets after exit from the dryer and prior to cooling were contacted with a liquid mixture of animal digest, choice white grease and soy bean oil heated at 120° F. within a coating reel at the following proportions:

| INGREDIENTS | % |
| --- | --- |
| Dry pellets | 86.9 |
| Animal digest | 5.0 |
| Choice white grease | 7.1 |
| Soy bean oil | 1.0 |

The pellets were tumbled in the coating reel for approximately 1 minute and had a uniform coating of the mixture absorbed on the pellet surfaces. The coated product was then removed from the coating reel and cooled to +10° F. of ambient temperature.

A group of 10 pure-bred beagle dogs (ages 1 to 6 years) were individually housed and fed one time per day 90-100 pellets (250 grams) prepared in accordance with the Example which was adequate to maintain the weight of each dog for a one week test period.

Throughout, and on completion of the test, the general health of the dogs remained good. No digestive upset or metabolic change was observed.

Prior to the feeding test, each dog had been given a thorough dental prophylaxis to remove existing soft and hard deposits on the buccal surfaces of the maxilla and mandible (a total of 22 teeth per dog).

The teeth of each dog in the group was examined for plaque, stain and tartar upon the completion of the test period.

In this examination, each tooth was divided horizontally into a gingival half (next to the gumline) and an occlusal half (away from the gumline). Plaque was scored visually on the corresponding tooth surfaces after staining with 3% erythrosin solution using the following criteria: 1, plaque coverage of up to 25% of the buccal tooth surface; 2, plaque covering between 25 and 50% of the buccal tooth surface; 3, plaque covering between 50 and 75% of the buccal tooth surface and 4, plaque covering between 75 and 100% of the buccal tooth surface.

The thickness of the plaque was scored as follows: Light=1, Medium=2 and Heavy=3. Coverage and thickness scores for each individual tooth surface were then multiplied, to give a total score for that tooth surface. Gingival and occlusal scores were added for each tooth. All tooth scores were added for each animal, then divided by the number of teeth scored to give a mean plaque score for the animal. A mean group plaque score was obtained by averaging individual scores of all animals in the group.

Stain was scored visually on the corresponding tooth surfaces after drying the tooth surface with a gentle jet of air using the following criteria; each tooth was divided vertically into 3 segments, mesial, buccal and distal; the coverage and color of the stain in each segment was then graded independently, 1, stain coverage of up to 25% of the (messial, buccal or distal) surface, 2, up to 50%; 3, up to 75% and 4, up to 100%. The stain color was scored 1, L (light), 2, M (medium) and 3, D (dark). Coverage and thickness scores for each individual tooth surface were then multiplied, to give a total score for that tooth surface. Mesial, buccal and distal segment scores were added for each tooth. All tooth scores were added for each animal, then divided by the number of teeth scored to give a mean stain score for the animal. A mean group stain score was obtained by averaging individual scores of all animals in the group.

Tartar was scored visually four area coverage on the corresponding tooth surfaces in the same manner as stain.

The plaque, stain and tartar scores for this group of dogs which were fed food product are recorded in Table I below. For purposes of comparison, the procedure of the Example was repeated with the exception that the dogs were fed dry commercial pelletized dog food available from two different manufacturers, the second commercial dog food being the leading commercial dry dog food. The commercial dog food products, when fed to the dogs, were observed to crumble rather than fracture when chewed by the dogs. The results of these comparative tests are also recorded in Table I.

TABLE I

|  | Mean Group Plaque Score | Mean Group Stain Score | Mean Group Tartar Score |
|---|---|---|---|
| Example | 8.64 | 3.76 | 5.71 |
| Commercial Dog Food I | 12.29 | 6.83 | 7.43 |
| Commercial Dog Food II | 11.16 | 5.88 | 7.31 |

An examination of the scores recorded in Table I clearly show that the food product prepared in the Example, is significantly effective in reducing plaque, stain and tartar in dogs, especially when compared to the comparative commercial dry, pelletized dog food products.

The significance of the effectiveness of the dog food prepared in accordance with the practice of the present invention is demonstrated in Table II. Based on the mean group scores of Table I, the percent reduction obtained in plaque, stain and tartar obtained with the food products of the present invention (Example) as compared with the commercial comparative products are summarized in Table II below.

TABLE II

% REDUCTION IN PLAQUE, STAIN AND TARTAR ACHIEVED WITH DOG FOOD PRODUCT OF PRESENT INVENTION WHEN COMPARED TO COMMERCIAL DOG FOOD PRODUCTS

|  | % Plaque Reduction | % Stain Reduction | % Tartar Reduction |
|---|---|---|---|
| Commercial Dog Food I | 29.7 | 44.9 | 23.1 |
| Commercial Dog Food II | 22.6 | 36.1 | 21.9 |

For purposes of further comparison, a dog food product was prepared in accordance with the procedure of the Example with the exception that the inner walls of the die used for the extrusion of the product were not coated with Teflon or any other low coefficient of friction coating; examination of the matrix of the product indicated that the fibrous ingredient was randomly distributed in the matrix.

The pelletized product, when fed to dogs, was observed to crumble rather than fracture when chewed by the dogs.

What is claimed is:

1. An animal food product comprised of a mixture containing proteins, fats, carbohydrates, fibers, vitamins and minerals the product having a matrix which, when chewed by an animal, is effective for removing plaque, tartar and stain from the teeth of the animal, the matrix being comprised of an extruded, expanded striated product having the fibers aligned in transverse striations through the matrix, the matrix being fracturable, and effective to induce a superior mechanical cleaning action on the animals teeth when chewed.

2. The food product of claim 1 wherein the product is prepared from a mixture containing about 35 to about 70% by carbohydrate, about 10 to about 35% by weight protein, about 10 to about 20% by weight fat and about 10 to about 25% by weight fiber.

3. The food product of claim 1 wherein the striated matrix has a density of about 10 to about 35 lbs/ft$_3$ and a moisture content of about 5 to 11% by weight.

4. A method of removing plaque, tartar and stain from the teeth of an animal which comprises preparing the animal food product of claim 1, and feeding the food product to the animal.

5. The method of claim 4 wherein the product is prepared from a mixture containing about 35 to about 70% by carbohydrate, about 10 to about 35% by weight protein, about 10 to about 20% by weight fat and about 10 to about 25% by weight fiber.

6. The method of claim 4 wherein the striated matrix has a density of about 10 to about 35 lbs/ft$^3$ and a moisture content of about 5 to 11% by weight.

7. The food product of claim 1 wherein the fiber is cellulose fiber.

8. A method of preparing an animal food product which is effective for removing plaque, tartar and stain from the teeth of an animal which comprises preparing a food mixture containing carbohydrates, proteins, fats and fiber bearing ingredients, working the mixture under mechanical pressure and heat sufficient to convert the mixture to a plasticized flowable mass and discharging the mass through a die, the internal walls of the die being maintained at a coefficient of friction of from 0.04 to 0.2 so as to obtain an expanded extrudate product having the fiber bearing ingredients aligned in transverse striations through the matrix which, when chewed by an animal, fractures and imparts an improved mechanical cleansing action to the animal's teeth.

9. The method of claim 7 wherein the inner walls of the discharge passage is coated with a fluorinated polyolefin.

10. The method of claim 9 wherein the fluorinated polyolefin is a polytetrafluoroethylene.

11. The method of claim 8 wherein the fiber bearing ingredients are cellulose fiber.

* * * * *